3,549,304
LEATHER DYEING AND COATING WITH A RESIN DYE COPOLYMER OF AN N-METHYLOLACRYL-AMIDE AND AN ALKYL ACRYLATE
Friedrich Ebel, Mannheim, Klaus Gulbins, Ludwigshafen (Rhine), Erwin Hahn, Viernheim, Hesse, Guenter Lange, Ludwigshafen (Rhine), Rudolf Schubert, Limburgerhof, Pfalz, and Hans Wilhelm, Hans Wolf and Lothar Wuertele, Ludwigshafen (Rhine), Germany, assignors to Badische Anilin- & Soda-Fabrik Aktiengesellschaft, Ludwigshafen (Rhine), Germany
No Drawing. Continuation-in-part of application Ser. No. 352,673, Mar. 17, 1964. This application Apr. 24, 1968, Ser. No. 723,912
Claims priority, application Germany, Mar. 21, 1963, 1,285,444
Int. Cl. D06p 3/32
U.S. Cl. 8—12                                3 Claims

ABSTRACT OF THE DISCLOSURE

Process of simultaneous dyeing and finishing of leather by applying thereto an aqueous dispersion of a colored addition copolymer obtained by the addition polymerization of a dye bearing at least one copolymerizable olefinically unsaturated group with at least one other polymerizable compound capable of yielding a transparent, adherent polymer coating on leather. For example, the leather may be finished with an aqueous dispersion of a yellow addition copolymer prepared from a yellow azo dye bearing a polymerizable N-acrylamino group, butyl acrylate, ethyl acrylate, acrylic acid and N-methylolacrylamide. The resulting finish imparts a level color to the leather and permits the leather grain to remain visible.

---

This application is a continuation-in-part of our copending application Ser. No. 352,673, filed Mar. 17, 1964 (now abandoned).

This invention relates to a new process for the simultaneous dyeing and finishing or dressing of leather with aqueous dispersions of colored polymers and also to leather which has been dyed and finished by this process.

Dyeing and simultaneously finishing leather by coating it with a film of a transparent lacquer in which a dye has been dissolved is already known. The dyeings on leather finished in this way have very poor mechanical resistance, for example resistance to dry and wet abrasion. Moreover, the dye tends to diffuse through the leather and bleed from the back of the material.

It is therefore an object of this invention to provide a process for dyeing leather transparent shapes and at the same time finishing the leather, so that the grain remains fully visible and the product has good mechanical properties. It is a further object of the invention to dye leather particularly level shades. Another object of the invention is leather which has been dyed and finished by the said process.

We have found that leather can be dyed and simultaneously finished with excellent results by using aqueous dispersions of such colored polymers which are obtained by copolymerization of dyes having copolymerizable olefinically unsaturated groups with other polymerizable compouds. The mentioned colored polymers will hereinafter be referred to as "colored copolymers." The term polymer is to be understood as including both homopolymers and copolymers which have been prepared by addition polymerization of olefinically unsaturated polymerizable compounds.

The production of the colored copolymers to be used according to the invention is known for example from U.S. patent specification No. 3,277,119 and from British patent specifications No. 877,402 and No. 949,404.

It is preferred to use aqueous dispersions of colored copolymers containing 20 to 50% by weight of solids obtainable by emulsion polymerization of 1 to 15% by weight (with reference to the solids content of the dispersion) of a polymerizable dye and the remainder of monomers which are used for the production of colorless finishing agents and binders.

Azo dyes and anthraquinone dyes are particularly suitabel as polymerizable dyes, examples being those having the following formulae:

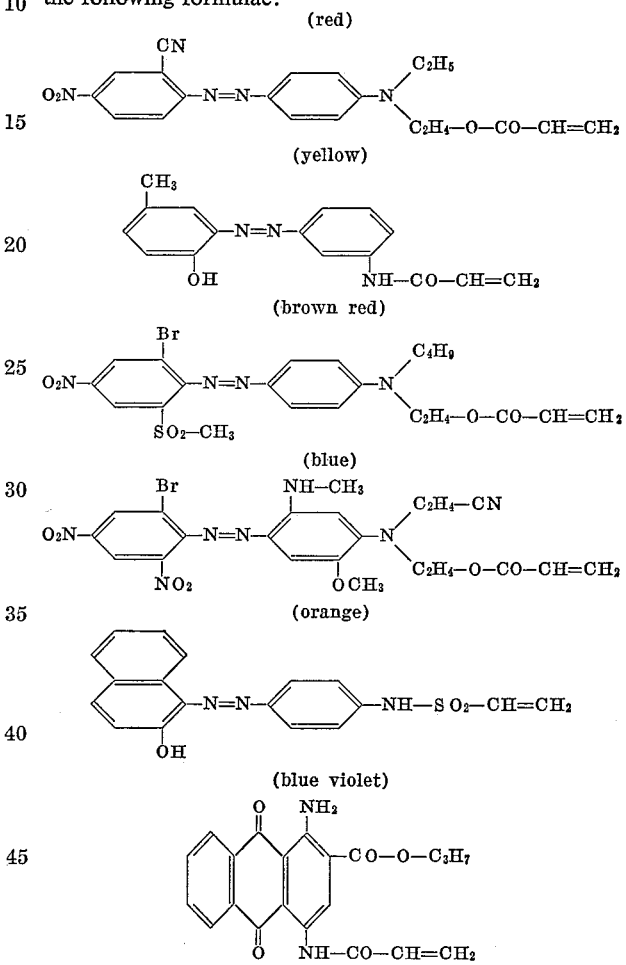

This list of suitable dyes is by no means exhaustive but is merely included to indicate by a few examples some dyes which may be used for the colored copolymers to be used according to this invention. Other dyes of this type are specified in the above-mentioned patent specifications.

All intermediate shapes up to a practically black dyeing may be prepared from copolymer dispersions obtainable with such dyes by mixing.

Colorless comonomers are for example vinyl chloride, vinylidene chloride, acrylonitrile, methacrylonitrile, acrylic acid, methacrylic acid, lower acrylic esters, lower methacrylic esters, acrylamide, methacrylamide, vinyl esters, such as vinyl acetate and vinyl proprionate, vinyl ethers, N-vinyl lactams, such as N-vinylpyrrolidone, styrene, isobutylene and butadiene. Among other colorless comonomers, those have particular importance which bear reactive groups by means of which the colored copolymers may be crosslinked after they have been applied to the leather. Special mention may be made of N-methylolacrylamide and N - methylolmethacrylamide and their lower alkyl ethers, because polymers crosslink with these monomers in the presence of an acid catalyst even under mild conditions, that is, without heating to about 80° C.

The colored macromolecular substances to be used according to this invention are in other respects used in exactly the same way as the conventional colorless agents of this type, i.e. they may be applied to the leather in one or more layers with all the usual auxiliaries on all the usual equipment by all the conventional methods of application, and it is also possible to dye leather with these colored macromolecular substances in the drum. The success of the process is substantially independent of the nature and pretreatment of the leather. Some of the methods by which the objects of this invention can be achieved are described below, the preferred procedures being known to those skilled in the art. The leather is brushed or sprayed with the aqueous dispersion of the colored polymer. If it is desired to color the leather on both sides, it may be treated by dipping it into or drumming it in a bath containing the colored polymer in dispersed form. Leathers finished according to this invention can be glazed or plated by using colored polymers that lend themselves to this kind of aftertreatment.

The colored polymers, which in this connection may also be regarded generally as colored leather finishing agents, may also be used as binders for pigment finishes. In this case brightened finishes are obtained on the leather.

Finishes obtainable by the process according to this invention have excellent fastness properties because the dye cannot bleed or diffuse into the leather. Since this defect has always been observed hitherto when leather has been dyed and finished with agents containing dissolved dyes no useful method has been known for colored finishing of leather with adequate fastness unless the dye concentration is kept very low to minimize the said defect. In contrast to this, however, the new process permits leather to be coated with a transparent color with excellent fastness, particularly fastness to rubbing. As compared with pigment finishing this has the great advantage that the surface structure and grain of the leather, which is generally desirable, remains completely visible. A further considerable advantage is for example that dyeing and finishing of leather may now be carried out in one operation, when dyeing in a drum even from a cold liquor. Surprisingly, it has also been found that the colored finishes are extremely level and are thus obviously independent of the structure and of small faults in the leather.

The invention is further illustrated by the following examples.

EXAMPLE 1

Side leather is finished by brushing with a plastics dispersion having a 40% by weight solids content based on acrylic acid, ethyl acrylate, isobutyl acrylate, N-methylolmethacrylamide and 2,4,5 - trichloro - 4' - (N - ethyl-N - acryloyl - hydroxyethyl) - azo - benzene as a yellow dye. The finish is allowed to dry and the leather is then plated as usual. The leather finish thus obtained is elastic and has very good fastness, particularly good wet abrasion fastness. It gives to the leather a yellow brown color and the grain of the leather may be clearly seen.

Very good finishes are also obtained with dispersions having 2,4 - dichloro - 4' - (N - ethyl - N - acryloylhydroxyethyl) - azo - benzene, 2 - methoxy - 4 - nitro - 4'- (N-ethyl-N-acryloylhydroxyethyl)-azobenzene or 2-cyano-4 - nitro - 4' - (N - ethyl - N - acryloylhydroxyethyl) - azobenzene as the dyes in polymerized form and otherwise having the same composition.

The dispersion is prepared as follows, parts and percentages being by weight:

A solution of 0.3 part of potassium persulfate in 50 parts of water is added to 2 parts of a 20% aqueous solution of the sodium salt of a sulfonated reaction product of isooctylphenol with 25 moles of ethylene oxide and 0.24 part of a 50% aqueous solution of the sodium salt of sulfonated castor oil. 20 parts of ethyl acrylate is added, the mixture is emulsified and polymerization is initiated by heating to 80° C. under at atmosphere of nitrogen. During the course of one hour, a mixture is added which consists of 7.5 parts of acrylic acid, 5.5 parts of a 45% aqueous solution of N-methylolmethacrylamide, 68.5 parts of water, 8.0 parts of a 20% aqueous solution of the sodium salt of a sulfonated reaction product of isooctylphenol with 25 moles of ethylene oxide, 0.6 part of a 50% aqueous solution of the sodium salt of sulfonated castor oil and also a solution of 7 parts of one of the above-mentioned dyes in 40 parts of ethyl acrylate and 23 parts of isobutyl acrylate. At the same time a solution of 1.2 parts of potassium persulfate in 20 parts of water is added.

Polymerization is carried to completion within four hours at 80° C. and small amounts of volatile components are then distilled off, also at 80° C.

EXAMPLE 2

Side leather is colored by brushing or spraying with a plastics dispersion containing a 37.6% by weight proportion of solids and having the composition given below. It is allowed to dry and is plated as usual.

A yellow brown transparent coloring of excellent wet fastness and wet abrasion fastness is obtained.

The leather finished in this way may be aftertreated with a conventional gloss finish.

The dispersion is prepared by copolymerization of 2 parts of acrylic acid, 6 parts of N-methylolmethacrylamide, 6 parts of acrylonitrile, 12 parts of 2-chloropropanediol-(1,2)-monoacrylate, 52 parts of isobutylacrylate, 108 parts of butyl acrylate and 14 parts of firstmentioned dye in Example 1 in aqueous emulsion in the presence of 3 parts of potassium persulfate and 1.68 parts of a 50% aqueous solution of the sodium salt of sulfonated castor oil and 20 parts of a 20% aqueous solution of the sodium salt of a sulfonated reaction product of isooctylphenol with 25 moles of ethylene oxide in 283 parts of water.

EXAMPLE 3

Chrome-tenned, sammied calf leather is milled for one hour at 50° to 60° C. in a drum with a liquor of 200 parts of water and 10 parts of an orange colored 40% copolymer dispersion, the copolymer being absorbed practically quantitatively by the leather. The conventionel further processing is carried out and a full dyeing is obtained which does not bleed with water and is fast to rubbing and light. In particular the dyeing is very uniform in contrast to conventional dyeings with water-soluble dyes in which grain faults and scars are in general more strongly dyed than the surrounding portions.

The colored polymer dispersion is prepared at 85° C. by copolymerization of 262 parts of ethyl acrylate, 48 parts of methyl acrylate, 20 parts of 3-chloro-2-hydroxypropyl acrylate, 13 parts of butyl acrylate, 12 parts of acrylonitrile, 12 parts of N-methylolmethacrylamide, 4 parts of acrylic acid, 28 parts of the coupling product of diazotized 2,4,5-trichloroaniline with N-ethyl-N-acryloyl-hydroxy-ethyl-m-toluidine in the presence of 37 parts of a 20% aqueous solution of the sodium salt of a sulfonated reaction product of isooctylphenol with 25 moles of ethylene oxide, 6 parts of a 50% aqueous solution of the sodium salt of sulfonated castor oil and 6 parts of potassium persulfate in 560 parts of water.

EXAMPLE 4

A velvet leather which has been dyed in a drum in the conventional way with a red chromium complex of an acid azo dye is oversprayed with a dispersion of a colored copolymer which differs from the colored copolymer described in Example 3 only in that the dye therein is the coupling product of diazotized 2-chloro-4-nitraniline and N-ethyl-N-acryloyl-hydroxyethylaniline. The dyeing obtained by drum dyeing, which is by no means fast to rubbing, becomes completely fast to rubbing and at the same time brilliance is increased and water sensitivity of the dyeing is obviated. If the same dispersion is used as binder (instead of a conventional colorless binder) for a leather coating color based on molybdate red in the finishing of corrected grain side leather, a brilliant finish is obtained which does not bleed.

We claim:

1. A process for the simultaneous dyeing and finishing of leather which comprises applying to said leather an aqueous dispersion of colored copolymer obtained by the addition emulsion copolymerization, said copolymer consisting essentially of copolymerized monomeric units of
   (a) at least one lower alkyl acrylate;
   (b) a compound selected from the class consisting of N - methylolacrylamide, N - methylolmethacrylamide and their lower alkyl ethers; and
   (c) a monomeric dye selected from the class consisting of an azo dye and an anthraquinone dye, said monomeric dye bearing at least one copolymerizable olefinically unsaturated group and being present in said polymer in an amount of about 1 to 15% by weight with reference to (a), (b) and (c).

2. A process as claimed in claim 1 wherein the leather is simultaneously dyed and finished with the copolymer by tumbling in a drum containing said copolymer of claim 1.

3. The simultaneously dyed and finished leather product obtained by the process of claim 1.

References Cited

UNITED STATES PATENTS

| 1,500,844 | 7/1924 | Plauson | 8—11 |
| 3,423,358 | 1/1969 | Burke | 260—41 |
| 3,337,288 | 8/1967 | Horlguchi et al. | 8—4 |
| 3,277,119 | 10/1966 | Beyer | 260—377 |

FOREIGN PATENTS

| 877,402 | 9/1961 | Great Britain. |
| 949,404 | 2/1964 | Great Britain. |

DONALD LEVY, Primary Examiner

U.S. Cl. X.R.

8—13, 39, 41; 117—142